United States Patent
Nudelman et al.

(10) Patent No.: US 11,556,378 B2
(45) Date of Patent: Jan. 17, 2023

(54) OFFLOADING EXECUTION OF A MULTI-TASK PARAMETER-DEPENDENT OPERATION TO A NETWORK DEVICE

(71) Applicant: MELLANOX TECHNOLOGIES, LTD., Yokneam (IL)

(72) Inventors: Roman Nudelman, Kiryat Bialik (IL); Gil Bloch, Zichron Yaakov (IL); Daniel Marcovitch, Yokneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 163 days.

(21) Appl. No.: 17/120,321

(22) Filed: Dec. 14, 2020

(65) Prior Publication Data

US 2022/0188147 A1 Jun. 16, 2022

(51) Int. Cl.
G06F 9/48 (2006.01)
G06F 9/30 (2018.01)
G06F 9/54 (2006.01)

(52) U.S. Cl.
CPC ........ G06F 9/4881 (2013.01); G06F 9/30065 (2013.01); G06F 9/485 (2013.01); G06F 9/542 (2013.01)

(58) Field of Classification Search
CPC .................................................... G06F 9/4881
See application file for complete search history.

(56) References Cited

U.S. PATENT DOCUMENTS

| | | | |
|---|---|---|---|
| 4,933,969 A | 6/1990 | Marshall et al. | |
| 5,068,877 A | 11/1991 | Near et al. | |
| 5,325,500 A | 6/1994 | Bell et al. | |
| 5,353,412 A | 10/1994 | Douglas et al. | |
| 5,404,565 A | 4/1995 | Gould et al. | |
| 5,606,703 A | 2/1997 | Brady et al. | |
| 5,944,779 A | 8/1999 | Blum | |
| 6,041,049 A | 3/2000 | Brady | |
| 6,370,502 B1 | 4/2002 | Wu et al. | |
| 6,483,804 B1 | 11/2002 | Muller et al. | |
| 6,507,562 B1 | 1/2003 | Kadansky et al. | |
| 6,728,862 B1 | 4/2004 | Wilson | |
| 6,857,004 B1 | 2/2005 | Howard et al. | |

(Continued)

OTHER PUBLICATIONS

U.S. Appl. No. 16/782,118 Office Action dated Nov. 8, 2021.
(Continued)

*Primary Examiner* — Charlie Sun
(74) *Attorney, Agent, or Firm* — Kligler & Associates Patent Attorneys Ltd (57) ABSTRACT

A network device includes a network interface, a host interface and processing circuitry. The network interface is configured to connect to a communication network. The host interface is configured to connect to a host including a processor. The processing circuitry is configured to receive from the processor, via the host interface, a notification specifying an operation for execution by the network device, the operation including (i) multiple tasks that are executable by the network device, and (ii) execution dependencies among the tasks in response to the notification, the processing circuitry is configured to determine a schedule for executing the tasks, the schedule complying with the execution dependencies, and to execute the operation by executing the tasks of the operation is accordance with the schedule.

24 Claims, 6 Drawing Sheets

(56) References Cited

U.S. PATENT DOCUMENTS

| | | |
|---|---|---|
| 6,937,576 B1 | 8/2005 | Di Benedetto et al. |
| 7,102,998 B1 | 9/2006 | Golestani |
| 7,124,180 B1 | 10/2006 | Ranous |
| 7,164,422 B1 | 1/2007 | Wholey, III et al. |
| 7,171,484 B1 | 1/2007 | Krause et al. |
| 7,313,582 B2 | 12/2007 | Bhanot et al. |
| 7,327,693 B1 | 2/2008 | Rivers et al. |
| 7,336,646 B2 | 2/2008 | Muller |
| 7,346,698 B2 | 3/2008 | Hannaway |
| 7,555,549 B1 | 6/2009 | Campbell et al. |
| 7,613,774 B1 | 11/2009 | Caronni et al. |
| 7,636,424 B1 | 12/2009 | Halikhedkar et al. |
| 7,636,699 B2 | 12/2009 | Stanfill |
| 7,738,443 B2 | 6/2010 | Kumar |
| 7,760,743 B2 * | 7/2010 | Shokri ............... H04L 41/0663 714/25 |
| 8,213,315 B2 | 7/2012 | Crupnicoff et al. |
| 8,255,475 B2 | 8/2012 | Kagan et al. |
| 8,380,880 B2 | 2/2013 | Gulley et al. |
| 8,510,366 B1 | 8/2013 | Anderson et al. |
| 8,645,663 B2 | 2/2014 | Kagan et al. |
| 8,738,891 B1 | 5/2014 | Karandikar et al. |
| 8,761,189 B2 | 6/2014 | Shachar et al. |
| 8,768,898 B1 | 7/2014 | Trimmer et al. |
| 8,775,698 B2 | 7/2014 | Archer et al. |
| 8,811,417 B2 | 8/2014 | Bloch et al. |
| 9,110,860 B2 | 8/2015 | Shahar |
| 9,189,447 B2 | 11/2015 | Faraj |
| 9,294,551 B1 | 3/2016 | Froese et al. |
| 9,344,490 B2 | 5/2016 | Bloch et al. |
| 9,456,060 B2 | 9/2016 | Pope et al. |
| 9,563,426 B1 | 2/2017 | Bent et al. |
| 9,626,329 B2 | 4/2017 | Howard |
| 9,756,154 B1 | 9/2017 | Jiang |
| 10,015,106 B1 | 7/2018 | Florissi et al. |
| 10,158,702 B2 | 12/2018 | Bloch et al. |
| 10,284,383 B2 | 5/2019 | Bloch et al. |
| 10,296,351 B1 | 5/2019 | Kohn et al. |
| 10,305,980 B1 | 5/2019 | Gonzalez et al. |
| 10,318,306 B1 | 6/2019 | Kohn et al. |
| 10,425,350 B1 | 9/2019 | Florissi |
| 10,521,283 B2 | 12/2019 | Shuler et al. |
| 10,528,518 B2 | 1/2020 | Graham et al. |
| 10,541,938 B1 | 1/2020 | Timmerman et al. |
| 10,547,553 B2 | 1/2020 | Shattah et al. |
| 10,621,489 B2 | 4/2020 | Appuswamy et al. |
| 2002/0010844 A1 | 1/2002 | Noel et al. |
| 2002/0035625 A1 | 3/2002 | Tanaka |
| 2002/0150094 A1 | 10/2002 | Cheng et al. |
| 2002/0150106 A1 | 10/2002 | Kagan et al. |
| 2002/0152315 A1 | 10/2002 | Kagan et al. |
| 2002/0152327 A1 | 10/2002 | Kagan et al. |
| 2002/0152328 A1 | 10/2002 | Kagan et al. |
| 2002/0165897 A1 | 11/2002 | Kagan et al. |
| 2003/0018828 A1 | 1/2003 | Craddock et al. |
| 2003/0061417 A1 | 3/2003 | Craddock et al. |
| 2003/0065856 A1 | 4/2003 | Kagan et al. |
| 2003/0120835 A1 | 6/2003 | Kale et al. |
| 2004/0030745 A1 | 2/2004 | Boucher et al. |
| 2004/0062258 A1 | 4/2004 | Grow et al. |
| 2004/0078493 A1 | 4/2004 | Blumrich et al. |
| 2004/0120331 A1 | 6/2004 | Rhine et al. |
| 2004/0123071 A1 | 6/2004 | Stefan et al. |
| 2004/0252685 A1 | 12/2004 | Kagan et al. |
| 2004/0260683 A1 | 12/2004 | Chan et al. |
| 2005/0097300 A1 | 5/2005 | Gildea et al. |
| 2005/0122329 A1 | 6/2005 | Janus |
| 2005/0129039 A1 | 6/2005 | Biran et al. |
| 2005/0131865 A1 | 6/2005 | Jones et al. |
| 2005/0223118 A1 | 10/2005 | Tucker et al. |
| 2005/0281287 A1 | 12/2005 | Ninomi et al. |
| 2006/0282838 A1 | 12/2006 | Gupta et al. |
| 2007/0127396 A1 | 6/2007 | Jain et al. |
| 2007/0127525 A1 | 6/2007 | Sarangam et al. |
| 2007/0162236 A1 | 7/2007 | Lamblin et al. |
| 2008/0104218 A1 | 5/2008 | Liang et al. |
| 2008/0126564 A1 | 5/2008 | Wilkinson |
| 2008/0168471 A1 | 7/2008 | Benner et al. |
| 2008/0181260 A1 | 7/2008 | Vonog et al. |
| 2008/0192750 A1 | 8/2008 | Ko et al. |
| 2008/0219159 A1 | 9/2008 | Chateau et al. |
| 2008/0244220 A1 | 10/2008 | Lin et al. |
| 2008/0263329 A1 | 10/2008 | Archer et al. |
| 2008/0288949 A1 | 11/2008 | Bohra et al. |
| 2008/0298380 A1 | 12/2008 | Rittmeyer et al. |
| 2008/0307082 A1 | 12/2008 | Cai et al. |
| 2009/0037377 A1 | 2/2009 | Archer et al. |
| 2009/0063816 A1 | 3/2009 | Arimilli et al. |
| 2009/0063817 A1 | 3/2009 | Arimilli et al. |
| 2009/0063891 A1 | 3/2009 | Arimilli et al. |
| 2009/0182814 A1 | 7/2009 | Tapolcai et al. |
| 2009/0240838 A1 | 9/2009 | Berg et al. |
| 2009/0247241 A1 | 10/2009 | Gollnick et al. |
| 2009/0292905 A1 | 11/2009 | Faraj |
| 2009/0296699 A1 | 12/2009 | Hefty |
| 2009/0327444 A1 | 12/2009 | Archer et al. |
| 2010/0017420 A1 | 1/2010 | Archer et al. |
| 2010/0049836 A1 | 2/2010 | Kramer |
| 2010/0074098 A1 | 3/2010 | Zeng et al. |
| 2010/0095086 A1 | 4/2010 | Eichenberger et al. |
| 2010/0185719 A1 | 7/2010 | Howard |
| 2010/0241828 A1 | 9/2010 | Yu et al. |
| 2010/0274876 A1 | 10/2010 | Kagan et al. |
| 2010/0329275 A1 | 12/2010 | Johnsen et al. |
| 2011/0060891 A1 | 3/2011 | Jia |
| 2011/0066649 A1 | 3/2011 | Berlyant et al. |
| 2011/0093258 A1 | 4/2011 | Xu et al. |
| 2011/0119673 A1 | 5/2011 | Bloch et al. |
| 2011/0173413 A1 | 7/2011 | Chen et al. |
| 2011/0219208 A1 | 9/2011 | Asaad |
| 2011/0238956 A1 | 9/2011 | Arimilli et al. |
| 2011/0258245 A1 | 10/2011 | Blocksome et al. |
| 2011/0276789 A1 | 11/2011 | Chambers et al. |
| 2012/0063436 A1 | 3/2012 | Thubert et al. |
| 2012/0117331 A1 | 5/2012 | Krause et al. |
| 2012/0131309 A1 | 5/2012 | Johnson |
| 2012/0254110 A1 | 10/2012 | Takemoto |
| 2013/0117548 A1 | 5/2013 | Grover et al. |
| 2013/0159410 A1 | 6/2013 | Lee et al. |
| 2013/0159568 A1 | 6/2013 | Shahar et al. |
| 2013/0215904 A1 | 8/2013 | Zhou et al. |
| 2013/0312011 A1 | 11/2013 | Kumar et al. |
| 2013/0318525 A1 | 11/2013 | Palanisamy et al. |
| 2013/0336292 A1 | 12/2013 | Kore et al. |
| 2014/0019574 A1 | 1/2014 | Cardona et al. |
| 2014/0033217 A1 | 1/2014 | Vajda et al. |
| 2014/0040542 A1 | 2/2014 | Kim et al. |
| 2014/0047341 A1 | 2/2014 | Breternitz et al. |
| 2014/0095779 A1 | 4/2014 | Forsyth et al. |
| 2014/0122831 A1 | 5/2014 | Uliel et al. |
| 2014/0136811 A1 | 5/2014 | Fleischer et al. |
| 2014/0189308 A1 | 7/2014 | Hughes et al. |
| 2014/0211804 A1 | 7/2014 | Makikeni et al. |
| 2014/0258438 A1 | 9/2014 | Ayoub |
| 2014/0280420 A1 | 9/2014 | Khan |
| 2014/0281370 A1 | 9/2014 | Khan |
| 2014/0362692 A1 | 12/2014 | Wu et al. |
| 2014/0365548 A1 | 12/2014 | Mortensen |
| 2015/0074373 A1 | 3/2015 | Sperber et al. |
| 2015/0106578 A1 | 4/2015 | Warfield et al. |
| 2015/0143076 A1 | 5/2015 | Khan |
| 2015/0143077 A1 | 5/2015 | Khan |
| 2015/0143078 A1 | 5/2015 | Khan et al. |
| 2015/0143079 A1 | 5/2015 | Khan |
| 2015/0143085 A1 | 5/2015 | Khan |
| 2015/0143086 A1 | 5/2015 | Khan |
| 2015/0154058 A1 | 6/2015 | Miwa et al. |
| 2015/0178211 A1 | 6/2015 | Hiramoto et al. |
| 2015/0180785 A1 | 6/2015 | Annamraju |
| 2015/0188987 A1 | 7/2015 | Reed et al. |
| 2015/0193271 A1 | 7/2015 | Archer et al. |
| 2015/0212972 A1 | 7/2015 | Boettcher et al. |
| 2015/0261720 A1 | 9/2015 | Kagan et al. |
| 2015/0269116 A1 | 9/2015 | Raikin et al. |

(56) References Cited

U.S. PATENT DOCUMENTS

| | | |
|---|---|---|
| 2015/0278347 A1 | 10/2015 | Meyer et al. |
| 2015/0347012 A1 | 12/2015 | Dewitt et al. |
| 2015/0365494 A1 | 12/2015 | Cardona et al. |
| 2015/0379022 A1 | 12/2015 | Puig et al. |
| 2016/0055225 A1 | 2/2016 | Xu et al. |
| 2016/0092362 A1 | 3/2016 | Barron et al. |
| 2016/0105494 A1 | 4/2016 | Reed et al. |
| 2016/0112531 A1 | 4/2016 | Milton et al. |
| 2016/0117277 A1 | 4/2016 | Raindel et al. |
| 2016/0119244 A1 | 4/2016 | Wang et al. |
| 2016/0179537 A1 | 6/2016 | Kunzman et al. |
| 2016/0219009 A1 | 7/2016 | French |
| 2016/0248656 A1 | 8/2016 | Anand et al. |
| 2016/0283422 A1 | 9/2016 | Crupnicoff et al. |
| 2016/0299872 A1 | 10/2016 | Vaidyanathan et al. |
| 2016/0342568 A1 | 11/2016 | Burchard et al. |
| 2016/0352598 A1 | 12/2016 | Reinhardt et al. |
| 2016/0364350 A1 | 12/2016 | Sanghi et al. |
| 2017/0063613 A1 | 3/2017 | Bloch et al. |
| 2017/0093715 A1 | 3/2017 | McGhee et al. |
| 2017/0116154 A1 | 4/2017 | Palmer et al. |
| 2017/0187496 A1 | 6/2017 | Shalev et al. |
| 2017/0187589 A1 | 6/2017 | Pope et al. |
| 2017/0187629 A1 | 6/2017 | Shalev et al. |
| 2017/0187846 A1 | 6/2017 | Shalev et al. |
| 2017/0192782 A1 | 7/2017 | Valentine et al. |
| 2017/0199844 A1 | 7/2017 | Burchard et al. |
| 2017/0262517 A1 | 9/2017 | Horowitz et al. |
| 2017/0308329 A1 | 10/2017 | A et al. |
| 2017/0344589 A1 | 11/2017 | Kafai et al. |
| 2018/0004530 A1 | 1/2018 | Vorbach |
| 2018/0046901 A1 | 2/2018 | Xie et al. |
| 2018/0047099 A1 | 2/2018 | Bonig et al. |
| 2018/0089278 A1 | 3/2018 | Bhattacharjee et al. |
| 2018/0091442 A1 | 3/2018 | Chen et al. |
| 2018/0097721 A1 | 4/2018 | Matsui et al. |
| 2018/0173673 A1 | 6/2018 | Daglis et al. |
| 2018/0262551 A1 | 9/2018 | Demeyer et al. |
| 2018/0285316 A1 | 10/2018 | Thorson et al. |
| 2018/0287928 A1 | 10/2018 | Levi et al. |
| 2018/0302324 A1 | 10/2018 | Kasuya |
| 2018/0321912 A1 | 11/2018 | Li et al. |
| 2018/0321938 A1 | 11/2018 | Boswell et al. |
| 2018/0367465 A1 | 12/2018 | Levi |
| 2018/0375781 A1 | 12/2018 | Chen et al. |
| 2019/0018805 A1 | 1/2019 | Benisty |
| 2019/0026250 A1 | 1/2019 | Das Sarma et al. |
| 2019/0044889 A1 | 2/2019 | Serres et al. |
| 2019/0065208 A1 | 2/2019 | Liu et al. |
| 2019/0068501 A1 | 2/2019 | Schneder et al. |
| 2019/0102179 A1 | 4/2019 | Fleming et al. |
| 2019/0102338 A1 | 4/2019 | Tang et al. |
| 2019/0102640 A1 | 4/2019 | Balasubramanian |
| 2019/0114533 A1 | 4/2019 | Ng et al. |
| 2019/0121388 A1 | 4/2019 | Knowles et al. |
| 2019/0138638 A1 | 5/2019 | Pal et al. |
| 2019/0147092 A1 | 5/2019 | Pal et al. |
| 2019/0149486 A1 | 5/2019 | Bohrer et al. |
| 2019/0149488 A1 | 5/2019 | Bansal et al. |
| 2019/0171612 A1 | 6/2019 | Shahar et al. |
| 2019/0235866 A1 | 8/2019 | Das Sarma et al. |
| 2019/0303168 A1 | 10/2019 | Fleming, Jr. et al. |
| 2019/0303263 A1 | 10/2019 | Fleming, Jr. et al. |
| 2019/0324431 A1 | 10/2019 | Cella et al. |
| 2019/0339688 A1 | 11/2019 | Cella et al. |
| 2019/0347099 A1 | 11/2019 | Eapen et al. |
| 2019/0369994 A1 | 12/2019 | Parandeh Afshar et al. |
| 2019/0377580 A1 | 12/2019 | Vorbach |
| 2019/0379714 A1 | 12/2019 | Levi et al. |
| 2020/0005859 A1 | 1/2020 | Chen et al. |
| 2020/0034145 A1 | 1/2020 | Bainville et al. |
| 2020/0057748 A1 | 2/2020 | Danilak |
| 2020/0103894 A1 | 4/2020 | Cella et al. |
| 2020/0106828 A1 | 4/2020 | Elias et al. |
| 2020/0137013 A1 | 4/2020 | Jin et al. |
| 2020/0265043 A1 | 8/2020 | Graham et al. |
| 2020/0274733 A1 | 8/2020 | Graham et al. |
| 2021/0203621 A1 | 7/2021 | Ylisirnio et al. |

OTHER PUBLICATIONS

"Message Passing Interface (MPI): History and Evolution," Virtual Workshop, Cornell University Center for Advanced Computing, NY, USA, pp. 1-2, year 2021, as downloaded from https://cvw.cac.cornell.edu/mpi/history.

Pacheco, "A User's Guide to MPI," Department of Mathematics, University of San Francisco, CA, USA, pp. 1-51, Mar. 30, 1998.

Wikipedia, "Message Passing Interface," pp. 1-16, last edited Nov. 7, 2021, as downloaded from https://en.wikipedia.org/wiki/Message_Passing_Interface.

EP Application # 21183290.2 Search Report dated Dec. 8, 2021.

U.S. Appl. No. 16/782,118 Office Action dated Jun. 15, 2022.

U.S. Appl. No. 17/147,487 Office Action dated Jun. 30, 2022.

U.S. Appl. No. 16/782,118 Office Action dated Sep. 7, 2022.

Mellanox Technologies, "InfiniScale IV: 36-port 40GB/s Infiniband Switch Device", pp. 1-2, year 2009.

Mellanox Technologies Inc., "Scaling 10Gb/s Clustering at Wire-Speed", pp. 1-8, year 2006.

IEEE 802.1D Standard "IEEE Standard for Local and Metropolitan Area Networks—Media Access Control (MAC) Bridges", IEEE Computer Society, pp. 1-281, Jun. 9, 2004.

IEEE 802.1AX Standard "IEEE Standard for Local and Metropolitan Area Networks—Link Aggregation", IEEE Computer Society, pp. 1-163, Nov. 3, 2008.

Turner et al., "Multirate Clos Networks", IEEE Communications Magazine, pp. 1-11, Oct. 2003.

Thayer School of Engineering, "An Slightly Edited Local Copy of Elements of Lectures 4 and 5", Dartmouth College, pp. 1-5, Jan. 15, 1998 http://people.seas.harvard.edu/~jones/cscie129/nu_lectures/lecture11/switching/clos_network/clos_network.html.

"MPI: A Message-Passing Interface Standard," Message Passing Interface Forum, version 3.1, pp. 1-868, Jun. 4, 2015.

Coti et al., "MPI Applications on Grids: a Topology Aware Approach," Proceedings of the 15th International European Conference on Parallel and Distributed Computing (EuroPar'09), pp. 1-12, Aug. 2009.

Petrini et al., "The Quadrics Network (QsNet): High-Performance Clustering Technology," Proceedings of the 9th IEEE Symposium on Hot Interconnects (HotI'01), pp. 1-6, Aug. 2001.

Sancho et al., "Efficient Offloading of Collective Communications in Large-Scale Systems," Proceedings of the 2007 IEEE International Conference on Cluster Computing, pp. 1-10, Sep. 17-20, 2007.

Graham et al., U.S. Appl. No. 17/147,487, filed Jan. 13, 2021.

InfiniBand Architecture Specification, vol. 1, Release 1.2.1, pp. 1-1727, Nov. 2007.

Deming, "Infiniband Architectural Overview", Storage Developer Conference, pp. 1-70, year 2013.

Fugger et al., "Reconciling fault-tolerant distributed computing and systems-on-chip", Distributed Computing, vol. 24, Issue 6, pp. 323-355, Jan. 2012.

Wikipedia, "System on a chip", pp. 1-4, Jul. 6, 2018.

Villavieja et al., "On-chip Distributed Shared Memory", Computer Architecture Department, pp. 1-10, Feb. 3, 2011.

Ben-Moshe et al., U.S. Appl. No. 16/750,019, filed Jan. 23, 2020.

Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.

Gainaru et al., "Using InfiniBand Hardware Gather-Scatter Capabilities to Optimize MPI All-to-All", EuroMPI '16, Edinburgh, United Kingdom, pp. 1-13, year 2016.

Pjesivac-Grbovic et al., "Performance analysis of MPI collective operations", Cluster Computing, pp. 1-25, 2007.

(56) References Cited

OTHER PUBLICATIONS

Bruck et al., "Efficient Algorithms for All-to-All Communications in Multiport Message-Passing Systems", Proceedings of the sixth annual ACM symposium on Parallel algorithms and architectures, pp. 298-309, Aug. 1, 1994.

Chiang et al., "Toward supporting data parallel programming on clusters of symmetric multiprocessors", Proceedings International Conference on Parallel and Distributed Systems, pp. 607-614, Dec. 14, 1998.

Danalis et al., "PTG: an abstraction for unhindered parallelism", 2014 Fourth International Workshop on Domain-Specific Languages and High-Level Frameworks for High Performance Computing, pp. 1-10, Nov. 17, 2014.

Cosnard et al., "Symbolic Scheduling of Parameterized Task Graphs on Parallel Machines," Combinatorial Optimization book series (COOP, vol. 7), pp. 217-243, year 2000.

Jeannot et al., "Automatic Multithreaded Parallel Program Generation for Message Passing Multiprocessors using paramerized Task Graphs", World Scientific, pp. 1-8, Jul. 23, 2001.

Stone, "An Efficient Parallel Algorithm for the Solution of a Tridiagonal Linear System of Equations," Journal of the Association for Computing Machinery, vol. 10, No. 1, pp. 27-38, Jan. 1973.

Kogge et al., "A Parallel Algorithm for the Efficient Solution of a General Class of Recurrence Equations," IEEE Transactions on Computers, vol. C-22, No. 8, pp. 786-793, Aug. 1973.

Hoefler et al., "Message Progression in Parallel Computing—To Thread or not to Thread?", 2008 IEEE International Conference on Cluster Computing, pp. 1-10, Tsukuba, Japan, Sep. 29-Oct. 1, 2008.

Wikipedia, "Loop unrolling," pp. 1-9, last edited Sep. 9, 2020 downloaded from https://en.wikipedia.org/wiki/Loop_unrolling.

Chapman et al., "Introducing OpenSHMEM: SHMEM for the PGAS Community," Proceedings of the Forth Conferene on Partitioned Global Address Space Programming Model, pp. 1-4, Oct. 2010.

Priest et al., "You've Got Mail (YGM): Building Missing Asynchronous Communication Primitives", IEEE International Parallel and Distributed Processing Symposium Workshops, pp. 221-230, year 2019.

Wikipedia, "Nagle's algorithm", pp. 1-4, Dec. 12, 2019.

U.S. Appl. No. 16/430,457 Office Action dated Jul. 9, 2021.

Yang et al., "SwitchAgg: A Further Step Toward In-Network Computing," 2019 IEEE International Conference on Parallel & Distributed Processing with Applications, Big Data & Cloud Computing, Sustainable Computing & Communications, Social Computing & Networking, pp. 36-45, Dec. 2019.

EP Application # 20216972 Search Report dated Jun. 11, 2021.

U.S. Appl. No. 16/782,118 Office Action dated Jun. 3, 2021.

U.S. Appl. No. 16/789,458 Office Action dated Jun. 10, 2021.

U.S. Appl. No. 16/750,019 Office Action dated Jun. 15, 2021.

U.S. Appl. No. 17/147,487 Office Action dated Nov. 29, 2022.

\* cited by examiner

OFFLOADING EXECUTION OF A MULTI-TASK PARAMETER-DEPENDENT OPERATION TO A NETWORK DEVICE

TECHNICAL FIELD

Embodiments described herein relate generally to computer networks, and particularly to methods and systems for offloading execution of multi-task operations to a network device.

BACKGROUND

Operation of computers in advanced computing environments such as High-Performance Computing (HPC), Artificial intelligence (AI) and Machine Learning (ML) often involves fast execution of multi-task operations such as collective operations. A commonly used Application Programming Interface (API) for initiating collective operations in HPC environment is specified by the Message-Passing Interface (MPI) forum in "MPI: A Message-Passing Interface Standard," version 2.2, Sep. 4, 2009. Version 1.1 of the MPI standard was introduced in June, 1995.

Handling collective operations in HPC and other environments is known in the art. For example, U.S. Pat. No. 8,811,417 describes a Network Interface (NI) that includes a host interface, which is configured to receive from a host processor of a node one or more cross-channel work requests that are derived from an operation to be executed by the node. The NI includes a plurality of work queues for carrying out transport channels to one or more peer nodes over a network. The NI further includes control circuitry, which is configured to accept the cross-channel work requests via the host interface, and to execute the cross-channel work requests using the work queues by controlling an advance of at least a given work queue according to an advancing condition, which depends on a completion status of one or more other work queues, so as to carry out the operation.

SUMMARY

An embodiment that is described herein provides a network device that includes a network interface, a host interface and processing circuitry. The network interface is configured to connect to a communication net. The host interface is configured to connect to a host including a processor. The processing circuitry is configured to receive from the processor, via the host interface, a notification specifying an operation for execution by the network device, the operation including (i) multiple tasks that are executable by the network device, and (ii) execution dependencies among the tasks in response to the notification, the processing circuitry is configured to determine a schedule for executing the tasks, the schedule complying with the execution dependencies, and to execute the operation by executing the tasks of the operation in accordance with the schedule.

In some embodiments, the processing circuitry is configured to generate work re quests based on the tasks, and to execute the work requests in accordance with the schedule. In other embodiments, the processing circuitry is configured to post the work requests on one or more queues, and to execute the posted work requests sequentially within each queue. In yet other embodiments, the processing circuitry is configured to determine the schedule to execute a work request in a first queue conditionally on execution of another work request in another queue.

In an embodiment, the operation includes an operation to be executed collectively by a client process running on the processor of the host and by one or more peer processes running on at least one of (i) the processor of the host and (ii) one or more remote hosts coupled to the communication network. In another embodiment, at least one of the peer processes performs the operation in software. In yet another embodiment, the processing circuitry is configured to notify the host in response to completing execution of all the tasks of the operation. In yet further another embodiment, the notification further specifies one or more parameters on which execution of a given task depends, and the processing circuitry is configured to execute the given task based on the one or more parameters.

In some embodiments, a given execution dependency specifies starting execution of a second task only after execution of a firsts task has completed, and the processing circuitry is configured to determine the schedule to condition starting execution of the second task on completion of execution of the first task. In another embodiment, a given execution dependency specifies completing execution of a second task only after execution of a first task has completed, and the processing circuitry is configured to determine the schedule to condition completing execution of the second task on completion of execution of the first task. In yet. another embodiment, the notification specifies execution of one or more tasks in a loop, over a given number of iterations, and the processing circuitry is configured to determine the schedule responsively to the one or more tasks and to the number of iterations.

In some embodiments, the host interface is configured to connect to a host of a storage device that initiates the notification specifying the operation, and the processing circuitry is configured to execute the operation for the storage device.

There is additionally provided, in accordance with an embodiment that is described herein, a method, including, in a network device that connects to a communication network and to a host, receiving from a processor of the host a notification specifying an operation for execution by the network device, the operation including (i) multiple tasks that are executable by the network device, and execution dependencies among the tasks. In response to the notification, a schedule for executing the tasks is determined, the schedule complying with the execution dependencies. The operation is executed by executing the tasks of the operation in accordance with the schedule.

These and other embodiments will be more fully understood from the following detailed description of the embodiments thereof, taken together with the drawings in which:

DETAILED DESCRIPTION OF EMBODIMENTS

Overview

Embodiments that are described herein provide methods and systems for offloading execution of a multi-task operation to a network device.

In advanced computing environments such as HPC, computational and data transfer operations may be executed collectively by multiple processes running on one or more compute nodes that are interconnected via a suitable fabric network. Execution of a collective operation typically requires data transfer among the processes in the same or different compute nodes, and data manipulation by the processes. A given collective operation thus involves a corresponding communication pattern among the participating processes for data exchange and aggregation.

In the present context, a network device comprises a device that connects to a communication network. An example network device is a network adapter, e.g., a Network Interface Card (NIC).

A collective operation is typically specified by multiple tasks and dependencies among the tasks. In principle, a processor of the host e.g., a host CPU or a Graphics Processing unit (GPU) within the host, could execute a collective operation in software, by translating the operation into corresponding tasks and dependencies, and then executing the tasks in accordance with the dependencies. Translation of an operation into tasks and dependencies, however, imposes a significant burden on the host CPU, especially when the CPU executes this operation frequently. Moreover, the CPU is occupied in orchestrating execution of the tasks and therefore the CPU bandwidth remaining for other processing is reduced.

In the disclosed embodiments, execution of multi-task operations, such as collective operations, is efficiently offloaded to a network adapter. The network adapter may be used for connecting the host to a communication network. Alternatively or additionally, the network adapter provides communication among processes of the same compute node. To efficiently offload execution of multi-task operations to the network adapter, the multi-task operations are specified in templates comprising corresponding tasks and dependencies. Multiple operations that share the same or similar tasks and dependencies may be specified in a common template, wherein the actual operation is selectable using one or more parameters. The network adapter also supports performing multi-task operations whose templates have no parameters. Operations comprising different tasks and/or dependencies are typically specified in different templates.

In some embodiments, the host triggers the network adapter to execute a multi-task operation comprising (i) multiple tasks that are executable by the network adapter, and (ii) execution dependencies among the tasks. In response to the trigger, the network adapter determines a schedule for executing the tasks in compliance with the execution dependencies, and then executes the operation by executing the tasks of the operation in accordance with the schedule. In response to completing execution of all the tasks, the network adapter notifies completion of the entire operation to the host.

In some embodiments, processing circuitry of the network adapter generates Work Requests (WRs) based on the tasks and executes the WRs in accordance with the schedule. The processing circuitry posts the WRs on one or more queues, and executes the posted WR sequentially within each queue, and in parallel among different queues. In some embodiments, to determine a schedule that complies with the dependencies, the network adapter determines the schedule to execute a WR in a one queue conditionally on execution of another WR in another queue. In an embodiment, the operation comprises a collective operation to be executed collectively by a process running on the CPU of the host and one or more peer processes running on at least one of (i) the CPU and (ii) one or more remote hosts coupled to the communication network.

In some embodiments, the host further specifies in triggering the operation, one or more parameters on which execution of a given task depends. In such embodiments, the processing circuitry executes the given task based on the one or more parameters. For example, the given task comprises a data compression task, and a parameter selects a compression method among multiple available compression methods. In other embodiments, the multi-task operation requires no parameters for execution by the network adapter. In an embodiment, a parameter relates to the operation as a whole, and is "translated" into one or more parameters within one or more tasks.

In some embodiments, the schedule for executing the tasks supports various types of execution dependencies. For example, a given execution dependency specifies starting execution of a second task only after execution of a first task has completed, in which case the processing circuitry determines the schedule to condition starting execution of the second task on completion of execution of the first task. As another example, a given execution dependency specifies completing execution of a second task only after execution of a first task has completed. In this embodiment, the processing circuitry determines the schedule to condition completing execution of the second task on completion of execution of the first task.

In some embodiments, the triggered operation specifies execution of one or more tasks in a loop, over a given number of iterations. In such embodiments, the processing circuitry determines the schedule responsively to the one or more tasks and to the number of iterations, so as to execute the loop.

In the disclosed techniques, a network adapter completely relieves the host from the burden involved in executing a multi-task operation. By relieving the host CPU from orchestrating execution of the operation, the host CPU and network adapter may progress asynchronously. In the disclosed embodiments, the host interfaces the network adapter efficiently by providing a template specifying the tasks and dependencies of the operation to be executed. Similar operations may be specified in a common template and selected using one or more parameters. Other templates require no parameters. Templates may be determined and stored, to be invoked multiple times as required. A stored template is reused without duplication thus saving storage space.

System Description

Figure 1:
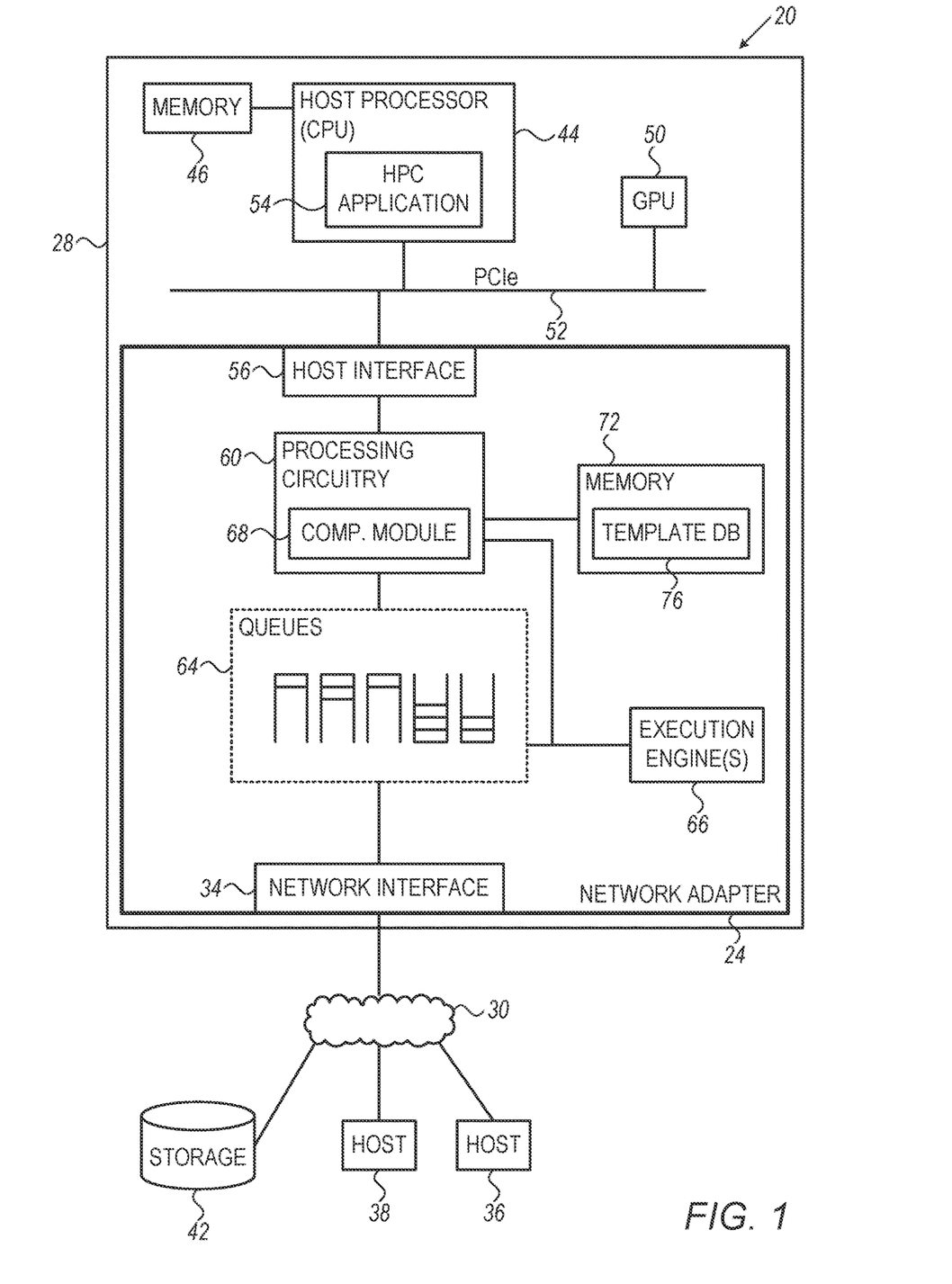
FIG. 1 is a block diagram that schematically illustrates a network adapter in a HPC environment, in accordance with an embodiment that is described herein.

FIG. 1 is block diagram that schematically illustrates a network adapter 24 in a HPC environment 20, in accordance with an embodiment that is described herein.

In the described embodiment a host server 28 is connected to a communication network 30 through a network interface 34. Communication network 30 provides switched connectivity among the nodes that are connected to it, in the present example hosts 28, 36 and 38 and storage system 42. The following schematic description of host 28 typically represents the other hosts as well. Alternatively, in some embodiments, a remote host such as 36 or 38 may not support the disclosed techniques for offloading multi-task operations for execution in the network adapter.

A host processor 44 stores data and instructions in a memory 46, and connects to a Graphic Processing Unit (GPU) 50 using any suitable bus 52, e.g., a Peripheral Component Interconnect (PCI)—Express (PCIe) bus. Host processor 44 may comprise a Central Processing Unit (CPU). In some embodiments, host processor 44 connects to GPU 50 using the NVLink bus (by Nvidia), for example, when host processor 44 comprises an IBM's Power8 CPU. Host processor 44 runs a HPC application 54 that uses memory 46 as a dynamic memory. In the present example, the HPC application includes collective commands that issue collective operations over communication network 30 by executing code modules of a suitable library such as, for example, an OpenMPI library that implements the MPI specification (not shown). Alternatively, other suitable libraries, such as a library that implements the Shared Memory (SHMEM) specification, can also be used.

Note that the disclosed techniques are not limited to collective operations and are also applicable to other multi-task operations. For example, the network adapter may encrypt data for the local host and store the encrypted data in some local or remote destination address.

In an embodiment, host processor 44, using for example, OpenMPI library code modules, implements the collective operation commands (or other multi-task operations) into operation templates for executing the collective operation commands by network adapter 24. In some embodiments, the implementation of the collective operations API (which are introduced, for example, in the OpenMPI library) are implemented using operation templates. In such embodiments the operation templates are part of the OpenMPI API implementation. The term "operation template" is also referred to herein simply as a "template" for brevity. The host processor may store templates in any suitable storage, e.g., in memory 46 or transfer the templates for storage in the network adapter through a host interface 56. The templates may be stored in any suitable local or remote storage that is accessible to the network adapter. In general, a multi-task operation, e.g., a collective operation may be executed by multiple processes running on processors of the same or different hosts. As such, each host that participates in performing a multi-task operation may run one or more processes for executing a multi-task operation. Processes within the same host, that participate in performing a multi-task operation, may communicate with one another via the network adapter that also serves for communication over the communication network.

As will be described in detail below, a template of an operation specifies tasks and dependencies. The tasks are to be executed in accordance with the dependencies to carry out the underlying operation. Processing circuitry 60 within network adapter 24 receives from host processor 44 requests for activating previously determined templates, and executes the corresponding operations using processing circuitry 60, as explained hereinafter.

Queues 64 comprise various types of queues, such as, for example, InfiniBand™ (IB) Receive Queues (RQs), Send Queues (SQs), and Completion Queues (CQs). In the present context, queues 64 are associated with one or more execution engines 66 that execute WRs posted on the queues. Execution engines 66 may be part of or separate from processing circuitry 60. In response to receiving a request to activate a given template, processing circuitry 60 loads WRs corresponding to the tasks specified in the given template (and possibly one or more control WRs) to selected queues 64, and execution engines 66 execute the posted WRs.

In some embodiments, queues 64 reside in a memory of the host. The network adapter may fetch a queue 64 or part thereof into a cache memory (not shown) in the network adapter, to reduce latency in accessing WRs in the queues.

Execution engines 66 may operate in various ways such as in parallel. In some embodiments, the execution engines may start executing WRs in queues 64 even before the network adapter generates and/or loads all the WRs corresponding to the template into the queues 64. This is important, for example, to reduce latency, and when the storage required for the WRs of the template is larger than the storage space available in queues 64.

The processing circuitry controls execution of WRs of in queues 64 corresponding to the template, based on the dependencies specified in the template. In particular, the processing circuitry conditions the advance of a given WR for example, on progress of WRs execution on other queues, and/or on reception or messages from peer nodes in some RQs through network interface 34. In some embodiments, other suitable conditions for advancing WR execution can be used, e.g., a suitable "wait" condition that is unrelated to WRs in the same or other queues.

In an embodiment, processing circuitry 60 further comprises a computation unit 68, which is configured in some embodiments as a data processing module, and/or an Arithmetic Logic Unit (ALU), for performing calculations that are specified by the WRs. The computation unit may also perform calculations on the parameters of the template. Computation unit 68 can be embedded within the processing circuitry, or it can be implemented separately within the network adapter and controlled by the processing circuitry. In some embodiments, computation unit 68 supports data processing such as data compression/decompression, and/or data encryption/decryption. Alternatively or additionally, other suitable data processing operations can also be used. For example, depending on the underlying processing required, vector and matrix operations can also be used.

Network adapter 24 comprises a memory 72 that is connected to processing circuitry 60 and serves to store code and data that the processing circuitry and the computation unit use.

In the example of FIG. 1, memory 72 stores templates of operations in a template database 76. In such an embodiment, activating a template by the host is very efficient because the activating process (e.g., HPC application 54) provides the network adapter only with a template ID and parameters. This requires sending only a small amount of data over bus 52 during to invocation and therefore enables high invocation rate and requires very little bandwidth. In other embodiments, template database 76, may be stored or distributed across any local or remote storage elements accessible to network adapter 24.

Network interface 34 may comprise one or ports (e.g., IB ports) for connecting to communication network 30.

The disclosed offloading techniques may be applicable to transport technologies other than the IB transport. For example, the operations may be applicable to, RDMA over Converged Ethernet (RoCE), TCP, UDP and any other suitable interfaces.

In some embodiments, GPU 50 efficiently executes a multi-task operation by activating a relevant template for executing the operation by the network adapter, similarly to template activation by the host CPU, as described above.

Storage system 42 may comprise any suitable storage system or device using any suitable storage technology. For example, storage system 42 may comprise a Solid-State Drive (SSD) implemented using Non-Volatile Memory (NVM) devices, e.g., Flash devices. Host processor 44 may communicate with storage system 42 using any suitable storage protocol, e.g., the NVM-Express (NVMe) over TCP (NVMe/TCP).

In some embodiments, storage system 42 comprises a host processor and a network adapter that connects to the host processor using a suitable host interface. The network adapter may connect to a communication network using a network interface. The host processor, network adapter and interfaces may be similar to host processor 44, network adapter 24, network adapter 34 and host interface 56 of FIG. 1. In such embodiments, the host of the storage system may offload execution of multi ask operations to the local network adapter in the form of templates.

The configurations of HPC environment 20, host 28 and network adapter 24 shown in FIG. 1 are example configurations, which are chosen purely for the sake of conceptual clarity. In alternative embodiments, any other suitable HPC environment, host and network adapter configurations can also be used. Elements of network adapter 24 and host 28 that are not mandatory for understanding the disclosed techniques are omitted from the figure for the sake of clarity.

In an example embodiment, network adapter 24 is implemented in a Network Interface Card (NIC). In alternative embodiments network adapter 24 is implemented in a chipset or a single chip.

Processing circuitry 60 and computation unit 68 are realized in an embodiment in hardware, which may comprise Field-Programmable Gate Arrays (FPGAs) and/or Application-Specific Integrated Circuits (ASICs). Each of host CPU 44 and processing circuitry 60 may also comprise a programmable element. comprising one or more dedicated or general-purpose processors, which run software for carrying out the methods described herein. The software may be downloaded to the processors in electronic form, over a network, for example, or it may, alternatively or additionally, be provided and/or stored on non-transitory tangible media, such as magnetic, optical, or electronic memory. Queues 64 and memory 72 are typically implemented in a random access memory such as Static Random Access Memory (SRAM) or Dynamic Random Access Memory (DRAM), which may be embedded within the processing circuitry or assembled separately in the network adapter. In some embodiments, queues 64 are stored in the host memory and part of them is cached into the network adapter.

Templates of Multi-Task Operations

As noted above, multi-task operations to be executed by network adapter 24 may be specified using templates. A template comprises the tasks of the underlying operation and dependencies according to which the tasks should be executed. The dependencies specify conditions for executing the tasks depending on execution progression of other tasks.

The tasks in the templates are executable by the network adapter, e.g., using computation unit 68. As such, an entire operation may be offloaded to the network adapter. Example tasks that are executable by network adapter 24 comprise, for example, data transfer, memory registration and de-registration, data compression and decompression, data encryption and decryption, or any other suitable task supported by network adapter 24.

In some embodiments, a template specifies resources of the network adapter (e.g., queues 64 and execution engines 66) allocated for executing the tasks in the template. The tasks in the template may be posted (e.g., as work requests) on one or more queues 64, and executed by execution engines 66. Alternatively, the network adapter decides on resource allocation internally. In some embodiments, network adapter 24 determines, based on the dependencies in the template, a schedule for executing the tasks using the allocated resources, so that the schedule complies with the dependencies. The network adapter then executes the operation by executing the tasks of the operation in accordance with the schedule.

A template may be represented by a graph in which vertices (or nodes) represent the tasks, and edges (e.g., arrows) represent the dependencies among the tasks. Example templates and graphs will be described below.

Figure 2A:
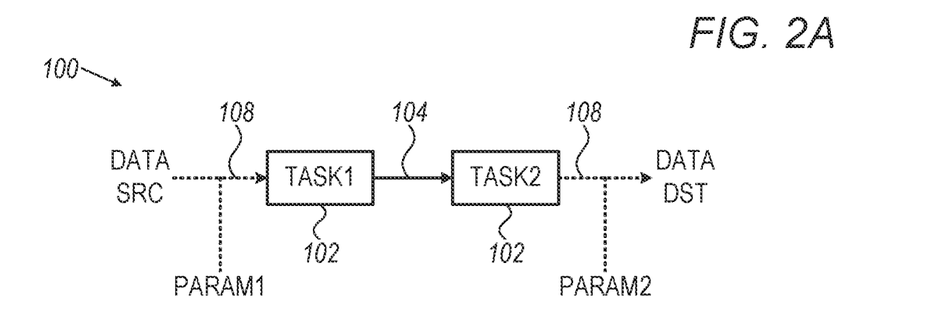
FIGS. 2A and 2B are diagrams that schematically illustrate graphs or example operation templates, in accordance with embodiments that are described herein.
Figure 2B:
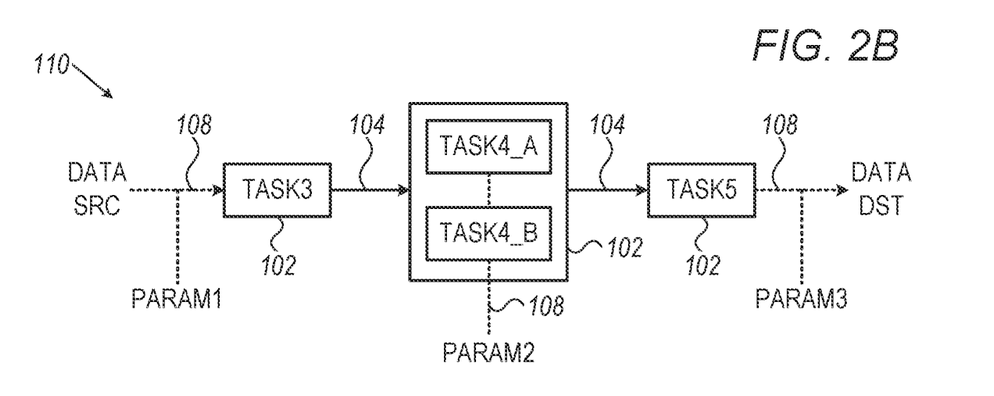

FIGS. 2A and 2B are diagrams that schematically illustrate graphs of example operation templates, in accordance with embodiments that are described herein.

The graph in FIG. 2A corresponds to a template 100 specifying an operation comprising tasks 102 denoted TASK1 and TASK2. An arrow 104 represents a dependency according to which the execution of TASK2 is conditioned on execution progression of TASK1. Dependencies of various types will be described further below.

In some embodiments, the host CPU provides a template to the network adapter, along with one or more parameters that are required for instantiation of the template for execution by the network adapter. By using parametrized templates, a given template can be used flexibly for specifying multiple similar operations. This results in an efficient interface between the host. and network adapter, and reduces storage space required for storing the templates.

The template in FIG. 2 can be instantiated for execution by network adapter 24 based on parameters 108 depicted in dotted lines. In this example, parameters denoted PAPAM1 and PARAM2 respectively specify a data source for TASK1 and a data destination for TASK2.

FIG. 2B depicts a graph of a template 110 specifying an operation comprising tasks 102, denoted TASK3, TASK4 and TASK5. Arrows 104 represent dependencies among the tasks, according to which execution of TASK4 is conditioned on execution progression of TASK3, and execution of TASK5 is conditioned on execution progression of TASK4. In the present example, TASK4 comprises different sub-tasks denoted TASK4_A and TASK4_B, which are selectable using a suitable parameter, as described herein.

The template of FIG. 2B is instantiated for execution by network adapter 24 based on parameters 108 depicted in dotted lines. In this example, parameters denoted PARAM1 and PARAM3 respectively specify a data source for TASK3 and a data destination for TASK5. A parameter denoted PARAM2 selects one of the internal tasks TAKS4_A and TASK4_B of TASK4. Template 110 thus supports an operation comprising TASK3, TASK4_A and TASK_5, and another operation comprising TASK3, TASK4_B and TASK_5.

Depending on the operation, a template may specify various types of dependencies 104 among tasks 102. Different types of dependencies apply different conditions on execution progression of the involved tasks.

Figure 3A:
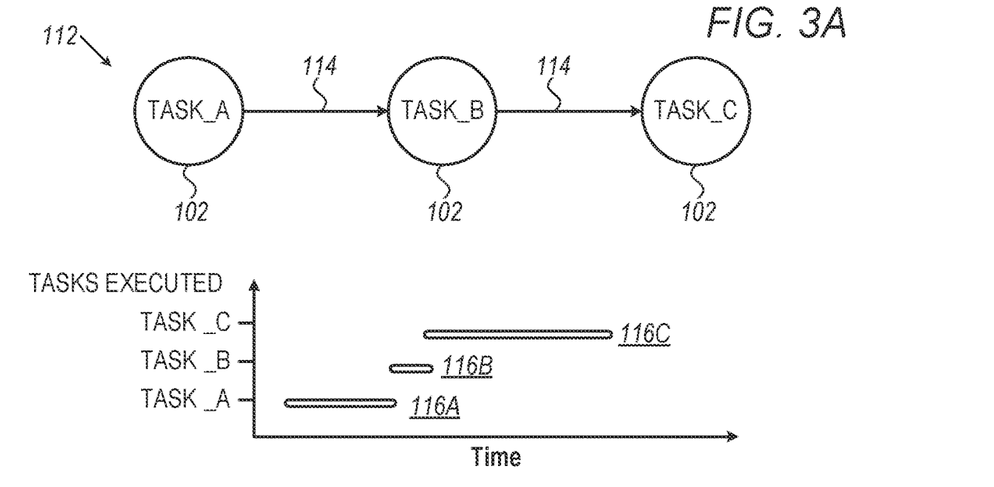
FIGS. 3A and 3B are diagrams that schematically illustrate graphs of templates using different types of dependencies, and corresponding timing diagrams, in accordance with embodiments that are described herein.
Figure 3B:
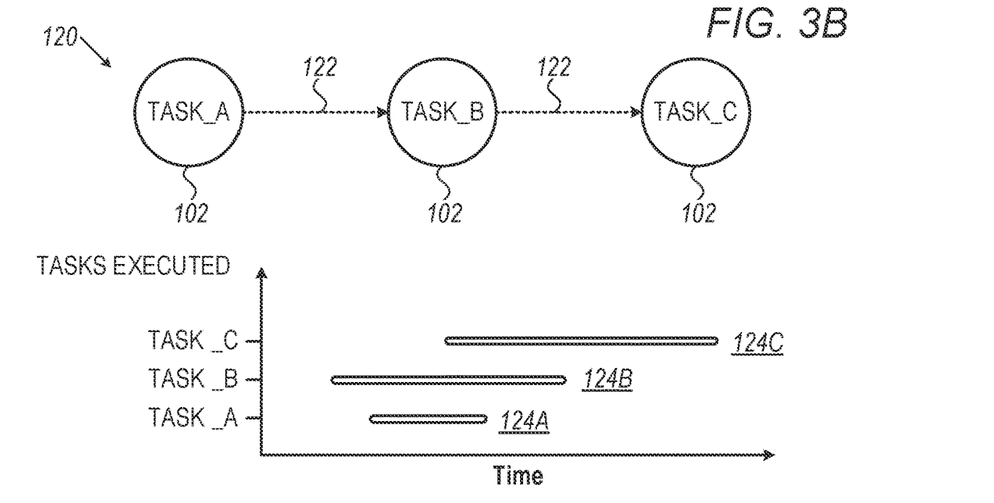

FIGS. 3A and 3B are diagrams that schematically illustrate graphs of templates using different types of dependencies, and corresponding timing diagrams, in accordance with embodiments that are described herein.

Template 112 in FIG. 3A comprises three tasks 102 denoted TASK_A, TASK_B and TASK_C. Arrows 114 depicted in a solid line, represent a type of dependency that conditions starting execution of one task on completion execution of another task. In the present example, TASK_B can start execution only after TASK_A completes execution, and TASK_C, can start execution only after TASK_B completes execution.

The timing diagram in the lower part of FIG. 3A depicts execution times of the three tasks. Specifically, horizontal bars 116A, 116B and 116C correspond to respective execution periods of TASK_A, TASK_B and TASK_C. In this example, bar 116B starts after bar 116A ends, and bar 116C starts after bar 116B ends.

Template 120 of FIG. 3B comprises tasks 102 denoted TASK_A, TASK_B and TASK_C. Arrows 122 depicted in a dotted line, represent a type of dependency that conditions the completion execution of one task on the completion of execution of another task. In the present example, TASK_B can complete execution only after TASK_A completes execution, and TASK_C can complete execution only after TASK_B completes execution.

The timing diagram in FIG. 3B depicts execution times of the three tasks. Specifically, horizontal bars 124A, 124B and 124C correspond to execution periods of TASK_A, TASK_B and TASK_C, respectively. Note that in this type of dependency, the start times of the tasks are unconstraint.

Figure 3C:
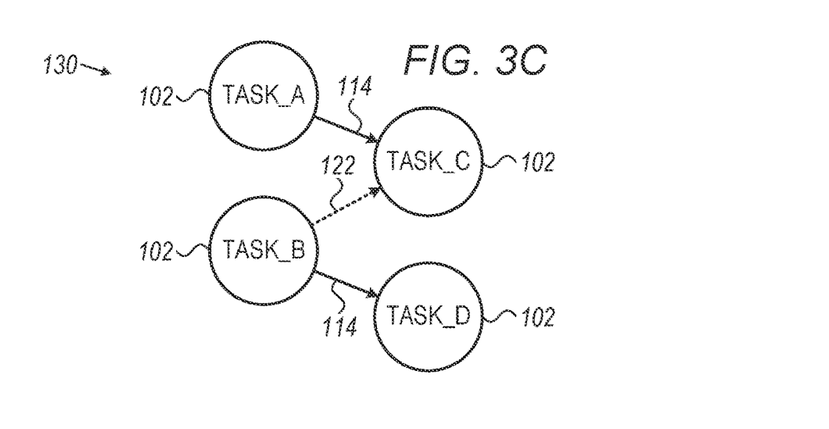
FIG. 3C is diagram that schematically illustrates a graph of a template comprising multi-dependency, in accordance with an embodiment that is described herein.

FIG. 3C is diagram that schematically illustrates a graph of a template 130 comprising multi-dependency, in accordance with an embodiment that is described herein.

Template 130 comprises four tasks 102 denoted TASK_A . . . TASK_D. As shown in the figure, TASK_C depends on both TASK_A and TASK_B, whereas TASK_D depends only on TASK_B. Specifically, the starting of TASK_C is conditioned on the completion of TAKS_A, and the completion of TASK_C is conditioned on the completion of TASK_B. The starting of TASK_D is conditioned on the completion of TASK_B.

Templates Comprising Loops

In some embodiments, network adapter 24 supports executing an operation specified by a template that contains a loop. A loop comprises one or more tasks that are executed sequentially a predefined number of iterations, e.g., provided as a parameter of the template. Loop representation in a template is much more efficient than unrolling the loop. A loop may be unrolled by generating a sequence of tasks defining a single loop iteration and duplicating the loop iteration in accordance with the number of iterations.

Figure 4:
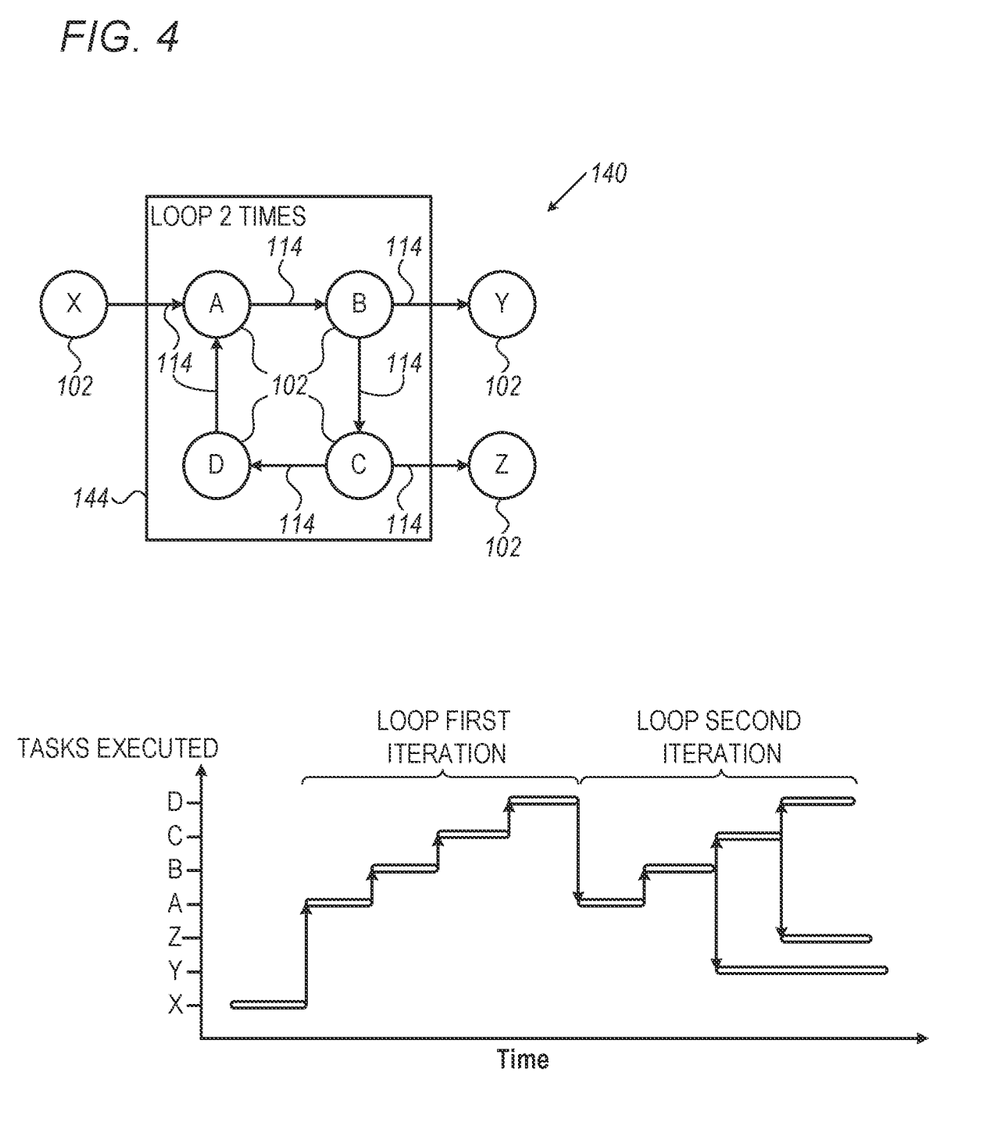
FIG. 4 is diagram that schematically illustrates a graph of a template that contains a loop, and a corresponding timing diagram, in accordance with an embodiment that is described herein.

FIG. 4 is diagram that schematically illustrates a graph of a template 140 that contains a loop, and a corresponding timing diagram, in accordance with an embodiment that is described herein.

In the present example, template 140 contains a loop 144 in which tasks 102 denoted A, B, C and D are executed sequentially twice. Alternatively, any other number of iterations can also be used. Template 140 further comprises a task denoted X that network adapter 24 executes before staring loop 144, and tasks denoted Y and Z that the network adapter executes after respective tasks B and C are executed twice. In the present example, the dependencies (114) condition one task on the completion of on one or more other tasks.

The timing diagram in FIG. 4 depicts execution times of the tasks in template 140 during execution of the underlying operation. As shown in the figure, the network adapter starts with execution of task X, followed by execution of the tasks in loop 144 over two iterations. In each iteration the network adapter sequentially executes the tasks A, B, C and D. After the second execution of tasks B and C, the network adapter executes task Y and Z, respectively.

In some embodiments, network adapter 24 supports templates comprising multiple loops. For example, a template may comprise two or more independent loops, each of which comprising dedicated tasks. In this case, the network adapter executes each loop independently from the other loops. As another example, the template may comprise nested loops. For example, an outer loop may contain an inner loop. In this case, the network adapter executes the tasks of the inner loop a predefined number of iterations, within each iteration of the outer loop. The number of iterations may be specified as a parameter of the template.

In an example embodiment, the tasks of a loop are posted as WRs on a common queue (64). In this embodiment, the template may specify the first and last entries in the queue corresponding to the first and last tasks to be repeated, and the number of iterations. In some embodiments, a template comprises a loop that comprise WRs posted on different queues (64), and the loop is controlled using appropriate control WRs.

In some embodiments, one or more tasks of the loop are omitted from the last iteration. For example, the loop repeats the sequence A, B and C over multiple iterations, and in last iteration executes only the tasks A and B, while omitting task C.

Template Instantiation

In some embodiments, the network adapter receives from the host a template ID via which it can access the template content in memory. The template may be stored in a template database (e.g., 76 in a memory 72 of the network adapter), for example, or in an external memory (e.g., memory 46 in the host) accessible to the network adapter. In general, the template database may be stored or distributed among any local and/or remote memory that is accessible to the network adapter. In some embodiments, to increase performance, the templates are stored in a memory of the network adapter. When the templates require a storage space larger than available in the network adapter, the templates may be stored in a memory of the host (e.g., 46) and cached into network adapter 24 as required.

As noted above, a single template may be shared among multiple similar operations. The similar operations may comprise the same tasks, with at least one of the tasks being configurable using a parameter.

In the present context, the term "instantiation" means preparing for executing the underlying operation in the network adapter, for example, using parameters accompanying the template, if any.

In some embodiments, the template specifies tasks in a WR formatting, wherein one or more of the WRs are modifiable. In such embodiments, the network adapter instantiates the template for execution, by modifying relevant WRs based on the parameters received with the template. The network adapter may modify a WR before posting it to a queue. Alternatively, the network adapter posts the WR to a queue and modifies the WR before executing it. In some embodiments, a template has no parameters, and is therefore specified in unmodifiable WRs. A template having no parameters is also instantiated for execution by the network adapter.

Sharable Templates

In some embodiments, e.g., for security reasons, a given template is restricted for execution by an authorized process. For example, the template is private for execution only by the process that has created it. In alternative embodiments, a template may be shared among multiple processes (based on template IDs or using any other suitable sharing mechanism). Further alternatively, a template may be stored in the network adapter, to be available for activation by all processes running on the host CPU (or GPU).

A Method for Execution of a Multi-Task Operation in a Network Adapter

Figure 5:
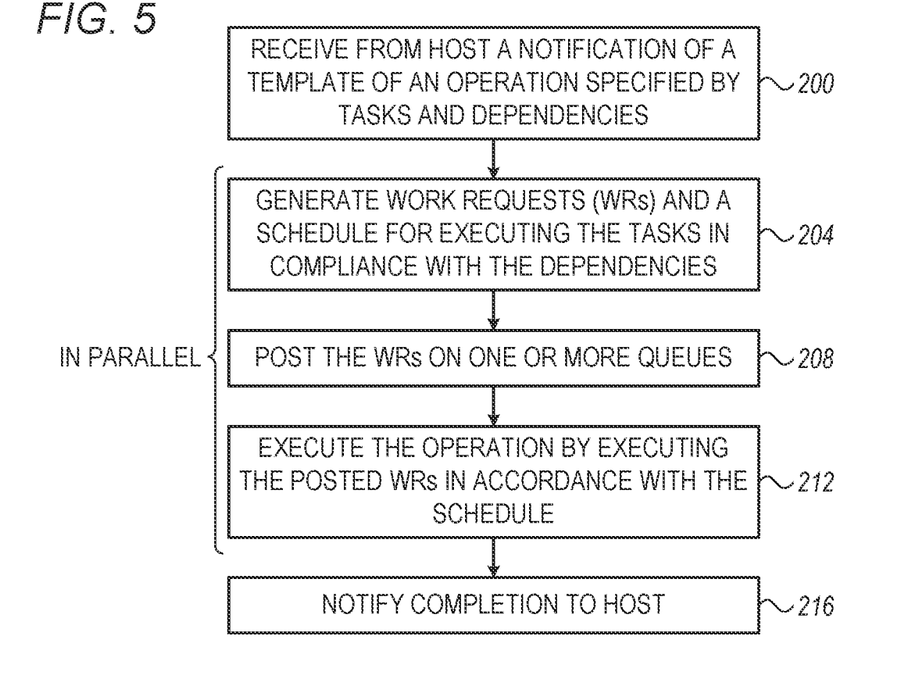
FIG. 5 is a flow chart that schematically illustrates a method for invocation of an offloaded multi-task operation to a network adapter, in accordance with an embodiment that is described herein.

FIG. 5 is a flow chart that schematically illustrates a method for invocation of an offloaded multi-task operation to a network adapter, in accordance with an embodiment that is described herein.

The method will be described as executed by various elements of network adapter 24, including processing circuitry 60.

The method begins with processing circuitry 60 receiving from host 28 via host interface 56, a notification for executing a multi-task operation, at a notification reception step 200. The notification is indicative of a template comprising tasks and dependencies specifying the required operation. For example, the notification may comprise a pointer or an index of the template in the template database. In some embodiments, the same template corresponds to multiple similar operations, in which case the notification further comprises one or more parameters that are required for the instantiation of a particular operation in the network adapter, as described above.

Based on the notification, the processing circuity executes the underlying multi-task operation by performing steps 204, 208 and 212 below in parallel.

At a WR generation step 204, the processing circuity generates WRs and a schedule for executing the WRs. In some embodiments, the processing circuitry generates the WRs based on the tasks in the template. For example, the processing circuitry generates for each task in the template a corresponding WR (or multiple WRs). In some embodiments, the processing circuitry generates one or more WRs that do not correspond to any of the tasks in the template. Such WRs may be used, for example, for controlling execution of the tasks specified in the template. The processing circuitry generates the schedule for executing the tasks so that the schedule complies with the dependencies specified in the template.

In some embodiments, the template specifies the tasks in a WR formatting. In such embodiments, the processing circuitry modifies at least one of the WRs based on parameters provided in the notification. In other embodiments, the processing circuitry does not modify any of the WRs, e.g., when the template has no parameters.

Note that the dependencies in the template refer to execution conditions among the tasks of the operation. The dependencies are thus unrelated to any resources in the network adapter that may be allocated for executing the operation. The schedule, on the other hand, is determined based on the dependencies, as well as on the resources in the network adapter allocated for the tasks. In some embodiments, the schedule may depend on one or more parameters specified in the notification. This provides the processing circuitry with flexibility to apply different schedules for the same template.

At a posting step 208, the processing circuitry posts the WRs of step 204 on one or more queues 64. In one embodiment, the processing circuitry distributes the WRs among queues 64 based on information provided in the notification of the template. In another embodiment, the processing circuitry determines, on the fly, a scheme for distributing the WRs among queues 64, based, for example, on current resources availability (e.g., queues 64 and/or execution engines 66).

At an operation execution step 212, the processing circuitry executes the operation, by executing the WRs posted in queues 64, in accordance with the schedule. At a completion step 216, the processing circuitry notifies the host that execution of the operation has completed. For example, the processing circuitry places a completion element on a relevant completion queue polled by the host, or by generating an interrupt to the process in the host (e.g., HPC application 54) that initiated the operation. Following step 216 the method terminates.

For efficient execution, the network adapter may perform two or more of steps 204, 208 and 212 in parallel. In an example embodiment, for a template of a high complexity multi-task operation, the network adapter generates some WRs of the template and starts posting and executing these WRs even before generation of all the WRs has completed. This approach is also useful when only a partial subset of the WR can be posted on the queues concurrently, e.g., due to limited storage space availability.

Storage Operation Executed by a Network Adapter

In host 28, a write operation to a remote storage system such as storage system 42 may be specified by a template comprising the following tasks, each of which is executable by network adapter 24:

Task1—Memory registration in local host (e.g., memory 46).

Task2: Data compression—compress the data to be written.

Task3: Data encryption—encrypt the compressed data.

Task4: Data write—send the encrypted data for storage in remote storage system (42).

Task5: memory de-registration (e.g., memory 46).

In the present example, the template further comprises dependencies among Task1 . . . Task5, requiring that each of the tasks may start execution only after the previous task in order has completed. In the present example, the instantiation of the template in network adapter 24 depends on the following parameters:

Param1: Source buffer—the address in the local host memory (e.g., 46) in which the data to be written is stored.

Param2: Compression parameters, e.g., the compression method to use.

Param3: Encryption parameters, e.g., the encryption method to use.

Param4: Destination buffer—the address in the storage system in which the data is to be stored.

Param5: The queues (64) on which to post the WRs corresponding to the tasks (and possibly also control WRs).

Some of the parameters above, such as the compression and encryption methods may have default values to be used when not provided explicitly. As noted above, the network adapter receives the template and parameters from the host (e.g., from CPU 44 or GPU 50) and posts WRs corresponding to the tasks on selected queues 64. To derive a schedule that complies with the dependencies, the network adapter may also post control WRs, e.g., a WR that causes execution in one queue to suspend until a selected WR completes execution in another queue.

Note that it is generally assumed that queue(s) serving for communication between the host and the remote storage have established connection with their peers before executing the template of the write operation.

In the present example, the network adapter distributes the WRs among three queues 64 denoted Q0, Q1 and Q2. Specifically, Q0 is assigned to memory registration and de-registration operations, Q1 is assigned to compression and encryption operations, and Q2 is assigned to communication with remote storage system 42. In this example, the WRs in each queue 64 are executed by a dedicated execution engine. This, however, is not mandatory, and other suitable allocations of processing engines to queues can also be used. Table 1 summarizes the assignment of WRs to queues 64 in the present example. In the table, the symbol "WR_ij" denotes the $j^{th}$ WR in the $i^{th}$ queue, Qi.

TABLE 1

A write storage operation translated into WRs in three queues.

| | Q0 | | Q1 | | Q2 |
|---|---|---|---|---|---|
| WR_00 | Register memory | WR_10 | Wait for WR_00 | WR_20 | Wait for WR_12 |
| WR_01 | Wait for WR_21 | WR_11 | Compress | WR_21 | Send data |
| WR_02 | De-register memory | WR_12 | Encrypt | | |

In executing the write operation, network adapter 24 executes the WRs posted on Q0, Q1 and Q2 in parallel, and sequentially within each of Q0, Q1 and Q2. In accordance with Table 1, the network adapter starts with executing WR_00 in Q0, while Q1 and Q2 are forced to suspend execution due to the respective wait requests WR_10 and WR_20. After memory registration is done, Q0 executes WR_01 that causes Q0 to wait for WR_12 in Q2. In parallel, Q1 starts executing compression (WR_11) followed by encryption (WR_12). After Q1 concludes executing WR_12, Q2 can start executing W_21 for sending the encrypted data to the storage system over communication network 30. When WR_21 completes, Q0 is released to de-register the memory by executing WR_02. The entire execution flow (omitting the wait WRs) can be summarized as follows: WR_00→WR_11→WR_12→WR_21→WR_02.

By executing the entire operation by the network adapter, the host CPU (or GPU) is freed for other processing, and the operation may be invoked by the host CPU (or GPU) at high rates.

An All-Reduce Operation Executed by a Network Adapter

The Recursive-doubling algorithm is a method commonly used in parallel computations. The Recursive-doubling algorithm is described, for example, by Peter M. Kogge and Harold S. Stone, in a paper titled "A Parallel Algorithm for the Efficient Solution of a General Class of Recurrence Equations," IEEE Transactions on Computers, volume C-22, issue 8, August 1973, pages 786-793. An example usage of the Recursive-doubling algorithm is described, for example, by Harold S. Stone, in a paper titled "An Efficient Parallel Algorithm for the Solution of a Tridiagonal Linear System of Equations," Journal of the Association for Computing Machinery, volume 20, number 1, January 1973.

Next is described a method for performing an "All-Reduce" collective operation, by network adapter 24, based on the Recursive-doubling method.

The method performs a distributed computation across multiple compute nodes, each of which executes parts of the computation. The sequence of tasks to be executed in each compute node can be formalized as a multi-task operation as described herein.

Figure 6:
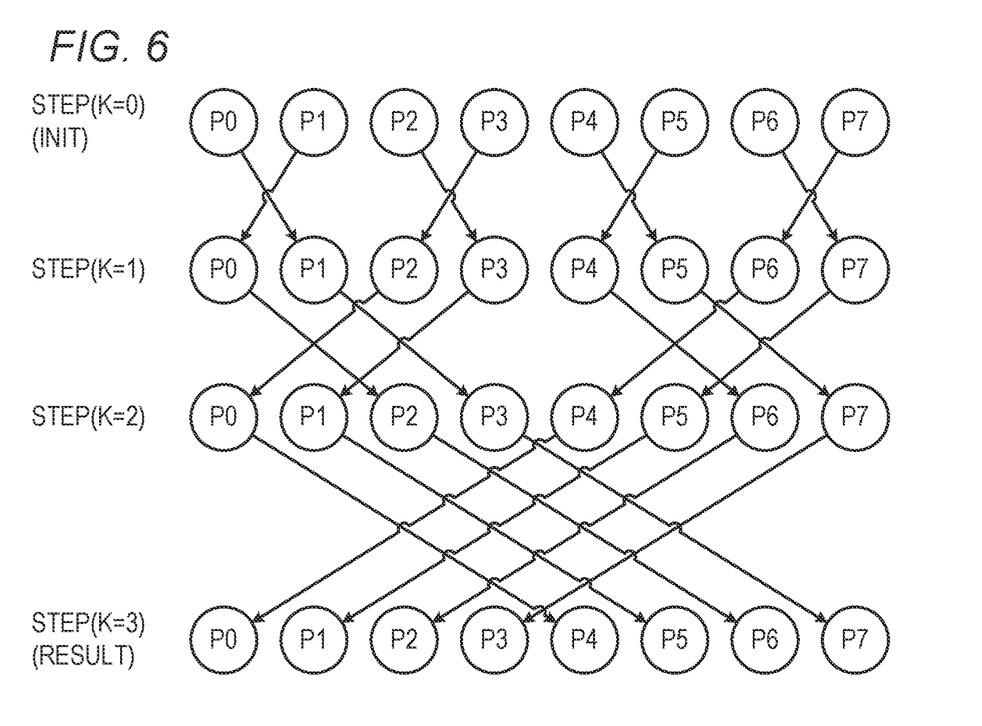
FIG. 6 is a diagram that schematically illustrates a processing flow in performing an All-Reduce operation based on the recursive-doubling method, in accordance with an embodiment that is described herein.

FIG. 6 is a diagram that schematically illustrates a processing flow in performing an All-Reduce operation based on the recursive-doubling method, in accordance with an embodiment that is described herein.

In the example of FIG. 6, eight processes 180, denoted P0 . . . P7, collectively perform the All-Reduce computation, and the result is shared among all the processes.

Let D(k,i) denote the data available locally in process Pi i=0 . . . 7, at step k=0 . . . 3. At an initialization step k=0, each process Pi holds data D(0,i), to be included in the computation. At each of steps k=0 . . . 2, a process Pi sends its data D(k,i) to a pear process Pj, and receives data D(k,j) from the peer process Pj. Each of processes Pi and Pj then reduces D(k,i) and D(k,j) into a local result that serves as the local data D(k+1,i) and D(k+1,j) for the next step (k+1). At step k=3, each process Pi has local data D(2,i) and received data D(2,j) from a peer process Pj. Process Pi then locally calculates the reduced result, which is common among all processes P0 . . . P7.

In the recursive calculation above, at each step k, the processes are paired differently so as to carry out the distributed calculation. For example, at steps k=0 . . . 2, P0 exchanges data with P1, P2 and P4, respectively, and at step k=3, P0 calculates the result based on its local data D(2,0) and data D(2,4) received from process P4.

The number of recursive rounds in the method above is given by Ceiling[log 2(P)], P being the number of processes, e.g., P=8 in the present example.

The method of FIG. 6 can be described for cases in which P is a power of 2, as a pseudocode for the $i^{th}$ process Pi as follows:

Input: data x:=D(0,i) at process Pi.
Output: Reduced data (common to all the processes).
x:=D(0,i)
for 0≤k<log 2(P) do
j:=i XOR $2^k$
Send x to Pj (skip for k==3)
Receive x' from Pj
x:=reduce(x,x')
endfor Note that the pseudocode above is suitable for a number of processes P that is a power of 2. When this condition is not met, additional steps (e.g., at the beginning and end of the method) are required to complete the All-Reduce collective operation.

In an embodiment, the All-Reduce operation described above may be executed by network adapter 24 using a template comprising suitable tasks and dependencies. Table 2 depicts decomposition the operation into tasks (WRs) posted on three queues 64 denoted Q0, Q1 and Q2.

TABLE 2

An All-Reduce operation translated into WRs in three queues.

| Q0<br>Peer j = (i XOR $2^0$) | | Q1<br>Peer j = (i XOR $2^1$) | | Q2<br>Peer j = (i XOR $2^2$) | |
|---|---|---|---|---|---|
| WR_00 | Register memory | WR_10 | Wait for WR_03 | WR_20 | Wait for WR_13 |
| WR_01 | Send to Pj | WR_11 | Send to Pj | WR_21 | Send to Pj |
| WR_02 | Receive from Pj | WR_12 | Receive from Pj | WR_22 | Receive from Pj |
| WR_03 | Reduce | WR_13 | Reduce | WR_23 | Reduce |
| WR_04 | Wait for WR_23 | | | | |
| WR_05 | De-register memory | | | | |

The parameters required for instantiation of the template are given by:

1. Source buffer address (the address of the memory where the input data resides).
2. The address of the destination processes Pj (j≠i).
3. The queues (64) on which to execute the WRs of the template.

Offloading the operations to the network adapter significantly reduces the overall execution latency of the operation, compared to implementation in software by the host CPU. The improvement is especially significant when the collective operation executed in each Pi above is dominated by communicating many small messages.

As shown in Table 2, WR_01, WR_02 and WR_03 in Q0, correspond to send, receive, and reduce tasks, respectively. Similarly, WR_11, WR_12 and WR_13 in Q1, and WR_21, WR_22 and WR_23 in Q2 correspond to send, receive, and seduce tasks. The cases only differ in the destination process in the send tasks and the source process in the receive task. In an embodiment, the All-Reduce operation described above can be specified in a template that contains a loop over the send, receive and reduce tasks. In an example embodiment, the network adapter executes the All-Reduce operation using a single queue Q0 as depicted in Table 3.

TABLE 3

All-Reduce operation in a single queue with a loop.

| Queue entry of Q0 | Loop | Task |
|---|---|---|
| 0 | No | WR_0 - Register memory |
| 1 | Yes | WR_1 - Send to Pj |
| 2 | Yes | WR_2 - receive from Pj |
| 3 | Yes | WR_3 - reduce |
| 4 | No | WR_4 - De-register memory |

In Table 3, the loop contains the tasks in entries 1, 2 and 3. The network adapter starts with executing the register memory task, then loops three times over the send, receive and reduce tasks, and then executes the de-register memory task. In each of the loop iterations, the network adapter selects the relevant process to be paired.

Template Generation Considerations

Templates specifying multi-task operations may be produced in various ways. For example, the templates can be determined manually, and provided to the host and/or to the network adapter via any suitable interfaces. Alternatively, the templates of multi-task operations may be determined automatically using a suitable software program. The software program may run on an external computer to produce the templates, which are then downloaded to the host or to the network adapter. Note that the templates may be generated at one time and loaded into a memory of the host, network adapter or any other suitable storage element, at another time. In some embodiments, host 28 runs a software program to produce the templates and downloads the produced templates to the network adapter via host interface 56.

Figure 7:
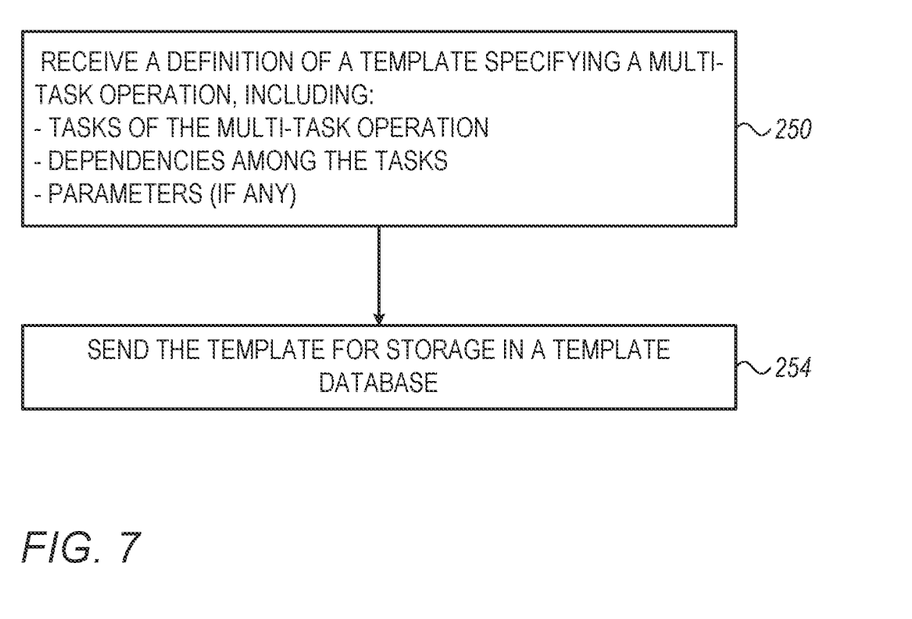
FIG. 7 is a flow chart that schematically illustrates a method for producing and storing a template of a multi-task operation, in accordance with an embodiment that is described herein.

FIG. 7 is a flow chart that schematically illustrates a method for producing and storing a template of a multi-task operation, in accordance with an embodiment that is described herein.

The method will be described as executed by host processor 44.

The method begins, at a template reception step 250, with host processor 44 receiving a definition of a template of a multi-task operation. The host processor may receive the template definition from a user, e.g., by running a program that provides a suitable man-machine interface. Alternatively, the host processor may receive the template definition using any other suitable method, e.g., reading the template definition from an external storage or receiving the template definition over the communication network, for example. The host processor typically stores the elements of the template, temporarily, in a suitable data structure, e.g., in memory 46.

In some embodiments, the template definition comprises definitions of (i) the tasks of the multi-task operation, (ii) dependencies among the tasks, and (iii) parameters (if any) required for executing the operation by the network adapter. The tasks may be specified in the form of work requests executable by the network adapter.

At a template storage step 254, the host processor sends the received template for storage, e.g., in a template database 76 of the network adapter. Alternatively, the host processor stores the template in memory 46 or in any other suitable memory, as described above.

The embodiments described above are given by way of example, and other suitable embodiments can also be used. For example, in some of the embodiments described above, a multi-task operation specifies tasks and dependencies to be executed by a single: process running on the: host. In general, however, a multi-task operation may be executed collectively by a process running on the host and other processes running locally on the host or remotely on remote hosts.

Although the embodiments described herein mainly address offloading execution of multi-task operations to a network device of a network node, the methods and systems described herein can also be used in other applications, such as in any entity that executes multi-task operations and that comprises a network adapter or another processor configured to offload the multi task operations using templates.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
    a network interface configured to connect to a communication network;
    a host interface, configured to connect to a host comprising a processor; and
    processing circuitry, configured to:
        receive from the processor, via the host interface, a notification specifying an operation for execution by the network device, the operation comprising (i) multiple tasks that are executable by the network device, and (ii) execution dependencies among the tasks;
        in response to the notification, determine a schedule for executing the tasks, the schedule complying with the execution dependencies; and
        execute the operation by executing the tasks of the operation in accordance with the schedule.

2. The network device according to claim 1, wherein the processing circuitry configured to generate work requests based on the tasks, and to execute the work requests in accordance with the schedule.

3. The network device according to claim 2, wherein the processing circuitry is configured to post the work requests on one or more queues, and to execute the posted work requests sequentially within each queue.

4. The network device according to claim 2, wherein the processing circuitry is configured to determine the schedule to execute a work request in a first queue conditionally on execution of another work request in another queue.

5. The network device according to claim 2, wherein the operation comprises an operation to be executed collectively by a client process running on the processor of the host and by one or more peer processes running on at least one of (i) the processor of the host and (ii) one or more remote hosts coupled to the communication network.

6. The network device according to claim 5, wherein at least one of the peer processes performs the operation in software.

7. The network device according to claim 1, wherein the processing circuitry is configured to notify the host in response to completing execution of all the tasks of the operation.

8. The network device according to claim 1, wherein the notification further specifies one or more parameters on which execution of a given task depends, and wherein the processing circuitry is configured to execute the given task based on the one or more parameters.

9. The network device according to claim 1, wherein a given execution dependency specifies starting execution of a second task only after execution of a first task has completed, and wherein the processing circuitry is configured to determine the schedule to condition starting execution of the second task on completion of execution of the first task.

10. The network device according to claim 1, wherein a given execution dependency specifies completing execution of a second task only after execution of a first task has completed, and wherein the processing circuitry is configured to determine the schedule to condition completing execution of the second task on completion of execution of the first task.

11. The network device according to claim 1, wherein the notification specifies execution of one or more tasks in a loop, over a given number of iterations, and wherein the processing circuitry is configured to determine the schedule responsively to the one or more tasks and to the number of iterations.

12. The network device according to claim 1, wherein the host interface is configured to connect to a host of a storage device that initiates the notification specifying the operation, and wherein the processing circuitry is configured to execute the operation for the storage device.

13. A method, comprising:
    in a network device that connects to a communication network and to a host, receiving from a processor of the host a notification specifying an operation for execution by the network device, the operation comprising (i) multiple tasks that are executable by the network device, and (ii) execution dependencies among the tasks;
    in response to the notification, determining a schedule for executing the tasks, the schedule complying with the execution dependencies; and
    executing the operation by executing the tasks of the operation in accordance with the schedule.

14. The method according to claim 13, and comprising generating work requests based on the tasks, and executing the work requests in accordance with the schedule.

15. The method according to claim 14, wherein generating the work requests comprises posting the work requests on one or more queues, and wherein executing the work requests comprises executing the posted work requests sequentially within each queue.

16. The method according to claim 14, wherein determining the schedule comprises determining the schedule to execute a work request in a first queue conditionally on execution of another work request in another queue.

17. The method according to claim 14, wherein the operation comprises an operation to be by a client process running on the processor of the host and by one or more peer processes running on at least one of (i) the processor of the host and (ii) one or more remote hosts coupled to the communication network.

18. The method according to claim 16, wherein at least one of the peer processes performs the operation in software.

19. The method according to claim 13, and comprising notifying the host in response to completing execution of all the tasks of the operation.

20. The method according to claim 13, wherein the notification further specifies one or more parameters on which execution of a given task depends, and wherein executing the tasks comprises executing the given task based on the one or more parameters.

21. The method according to claim 13, wherein a given execution dependency specifies starting execution of a second task only after execution of a first task has completed, and wherein determining the schedule comprises determining the schedule to condition starting execution of the second task on completion of execution of the first task.

22. The method according to claim 13, wherein a given execution dependency specifies completing execution of a second task only after execution of a first task has completed, and wherein determining the schedule comprises determining the schedule to condition completing execution of the second task on completion of execution of the first task.

23. The method according to claim 13, wherein the notification specifies execution of one or more tasks in a loop, over a given number of iterations, and wherein determining the schedule comprises determining the schedule responsively to the one or more tasks and to the number of iterations.

24. The method according to claim 13, wherein the host interface connects to a host of a storage device that initiates the notification specifying the operation, and wherein executing the operation comprises executing the operation for the storage device.

* * * * *